(12) United States Patent
Sellappan et al.

(10) Patent No.: US 12,180,122 B2
(45) Date of Patent: Dec. 31, 2024

(54) JOINING MATERIAL WITH SILICON CARBIDE PARTICLES AND REACTIVE ADDITIVES

(71) Applicant: Rolls-Royce High Temperature Composites, Inc., Cypress, CA (US)

(72) Inventors: Pathikumar Sellappan, Cypress, CA (US); Nesredin Kedir, Cypress, CA (US); Stephen Isaiah Harris, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 367 days.

(21) Appl. No.: 17/559,277

(22) Filed: Dec. 22, 2021

(65) Prior Publication Data

US 2023/0192564 A1    Jun. 22, 2023

(51) Int. Cl.
*C04B 37/00*    (2006.01)
(52) U.S. Cl.
CPC ...... *C04B 37/003* (2013.01); *C04B 2237/083* (2013.01); *C04B 2237/09* (2013.01); *C04B 2237/38* (2013.01); *C04B 2237/60* (2013.01); *C04B 2237/84* (2013.01)
(58) Field of Classification Search
CPC ............ C04B 37/003; C04B 2237/083; C04B 2237/09; C04B 2237/38; C04B 2237/60; C04B 2237/84; C04B 35/62807; C04B 35/6263; C04B 2235/3217; C04B 2235/3225; C04B 2235/5224; C04B 35/6316; C04B 2235/3826; C04B 2235/383; C04B 2235/3834; C04B 2235/5228; C04B 2235/5232; C04B 2235/5244; C04B 2235/5436; C04B 2235/5445; C04B 2235/5454; C04B 2235/5472; C04B 2235/80; C04B 2235/85; C04B 2237/341; C04B 2237/365; C04B 2237/368; C04B 2237/55; C04B 35/565; C04B 37/005; C04B 2237/343; C04B 2237/765
See application file for complete search history.

(56) References Cited

U.S. PATENT DOCUMENTS

| | | |
|---|---|---|
| 8,678,269 B2 | 3/2014 | Chaumat et al. |
| 9,366,140 B2 | 6/2016 | Chamberlain |
| 9,713,860 B2 | 7/2017 | Chaumat et al. |

(Continued)

*Primary Examiner* — Christopher W Raimund
(74) *Attorney, Agent, or Firm* — Shumaker & Sieffert, P.A.

(57) ABSTRACT

In some examples, a method including forming a layer of a slurry composition between a first ceramic or CMC part and a second ceramic or CMC part. The slurry composition includes a carrier material; and a plurality of solid particles in the carrier material. The plurality of solid particles includes first silicon carbide (SiC) particles defining a first average particle size, second SiC particles defining a second average particles size that is less than the first average particles size, and reactive additive particles. The method includes heating the layer of slurry composition to react the plurality of reactive additive particles to fuse the plurality of first SiC particles and the plurality of second SiC particles together with the reactive additive particles, wherein the fused layer of the slurry composition forms a joint layer that joins the first ceramic or CMC part to the second ceramic or CMC part.

20 Claims, 4 Drawing Sheets

(56) References Cited

U.S. PATENT DOCUMENTS

| | | | |
|---|---|---|---|
| 2003/0102071 A1* | 6/2003 | Mako | C04B 37/005 |
| | | | 156/89.11 |
| 2008/0226868 A1* | 9/2008 | Pickering | C04B 37/006 |
| | | | 428/428 |
| 2013/0266363 A1* | 10/2013 | Khalifa | C04B 35/6269 |
| | | | 403/270 |
| 2015/0315088 A1* | 11/2015 | Pick | C04B 35/565 |
| | | | 501/89 |
| 2016/0023957 A1 | 1/2016 | Landwehr et al. | |
| 2016/0244374 A1 | 8/2016 | Nelson et al. | |

* cited by examiner

JOINING MATERIAL WITH SILICON CARBIDE PARTICLES AND REACTIVE ADDITIVES

TECHNICAL FIELD

The present disclosure generally relates to materials for joining ceramic or ceramic matrix composite components.

BACKGROUND

Some articles formed from ceramics or ceramic matrix composites (CMCs) are more easily formed out of multiple parts. For example, the geometry of the article may be complex and may be difficult to form in a single piece. However, joining multiple parts formed of a ceramic or a CMC may be difficult, e.g., as the melting point of the ceramic or CMC may be very high, or the ceramic or CMC may decompose before melting.

SUMMARY

In some examples, the disclosure describes a method comprising: forming a layer of a slurry composition between a first ceramic or ceramic matrix composite (CMC) part and a second ceramic or CMC part, wherein the slurry composition comprises: a carrier material; and a plurality of solid particles in the carrier material, wherein the plurality of solid particles comprises: a plurality of first silicon carbide (SiC) particles defining a first average particle size, a plurality of second SiC particles defining a second average particles size that is less than the first average particles size, and a plurality of reactive additive particles, wherein the plurality of additive particles has a melting temperature that is less than the plurality of first SiC particles and the plurality of second SiC particles; and heating the layer of slurry composition to react the plurality of reactive additive particles to fuse the plurality of first SiC particles and the plurality of second SiC particles together with the reactive additive particles, wherein the fused layer of the slurry composition forms a joint layer that joins the first ceramic or CMC part to the second ceramic or CMC part.

In some examples, the disclosure describes an assembly comprising: a first ceramic or ceramic matrix composite (CMC) part; a second ceramic or CMC part adjacent to the first ceramic or ceramic matrix composite part; and a layer of slurry composition between the first ceramic or CMC part and the second ceramic or CMC part, wherein the slurry composition comprises: a carrier material; and a plurality of solid particles in the carrier material, wherein the plurality of solid particles comprises: a plurality of first silicon carbide (SiC) particles defining a first average particle size, a plurality of second SiC particles defining a second average particles size that is less than the first average particles size, and a plurality of reactive additive particles, wherein the plurality of additive particles has a melting temperature that is less than the plurality of first SiC particles and the plurality of second SiC particles, wherein the plurality of reactive additive particles are configured to, upon heating, react to fuse the plurality of first SiC particles and the plurality of second SiC particles together with the reactive additive particles, and wherein the fused layer of the slurry composition forms a joint layer that joins the first ceramic or CMC part to the second ceramic or CMC part.

The details of one or more examples are set forth in the accompanying drawings and the description below. Other features, objects, and advantages will be apparent from the description and drawings, and from the claims.

DETAILED DESCRIPTION

Figure 1A:
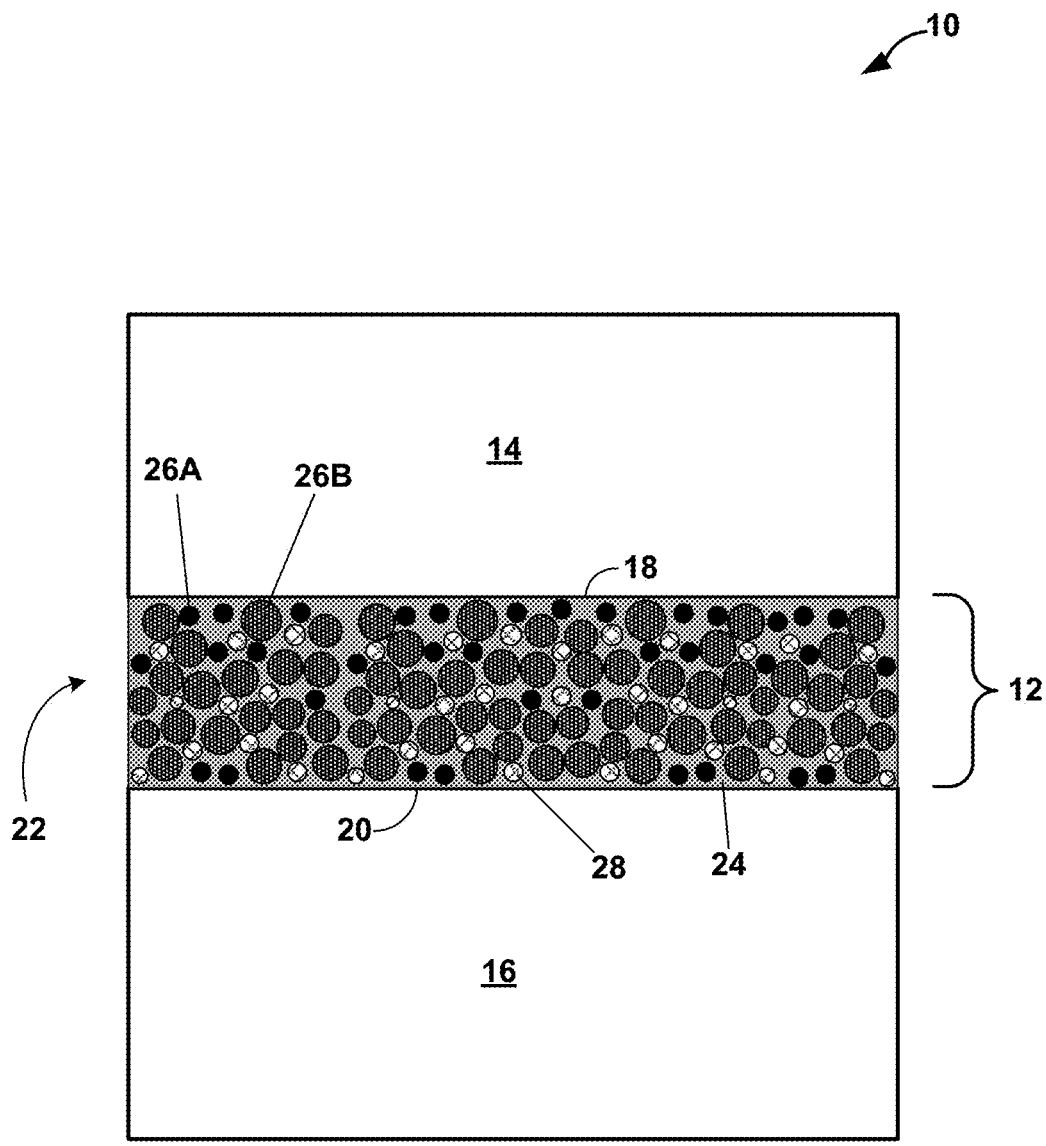
FIG. 1A is a conceptual schematic diagram illustrating an example composite assembly including a layer of slurry composition between two ceramic/CMC components in accordance with some examples of the disclosure.

The disclosure describes assemblies, systems, and techniques related to a slurry composition used to form a joint or other connection between a first ceramic or CMC part and a second ceramic or CMC part.

As described above, joining multiple parts formed of a ceramic or a CMC may be difficult, e.g., as the melting point of the ceramic or CMC may be very high, or the ceramic or CMC may decompose before melting. For ease of description, a ceramic or a CMC part may be referred to herein as a ceramic/CMC part.

A variety of approaches may be employed to join a CMC part to another CMC part and a CMC part to a ceramic part. For example, a metallic braze material may be applied between respective parts, where the braze material melts and resolidifies to form a bonded joint. As another example, an interference fit may be formed between respective parts during a cofiring process. As another example, joining of respective surfaces may be accomplished by localized melting through laser or other directed energy heating and joining the surfaces under pressure. As another example, a reactive composition may be applied between the respective parts and a high pressure and high temperature may be employed to form a joint with the material.

However, in the first example, metallic brazes may be limited to joining parts for assemblies that operate at relatively low temperatures and may not be sufficient for intended applications where high temperature capability of the overall assembly is required or otherwise desired. For the second example, interference fitting may require development of unique interlocking segments which requires specialized tooling and/or extensive machining for manufacturing. The process may also be constrained by the ability to tailor the thermal expansion behavior of the individual parts. With regard to an example process of joining via laser heating, localized melting of the part(s) may likely lead to a heat affected zone in the composite part where the mechanical properties may be degraded. Moreover, despite recent advances in laser technology, the cost of high-power lasers for this type of application still remains economically prohibitive. Finally, joining using a reactive composition may be a more feasible approach with the exception of the requirement to apply high pressure, e.g., during heating, to create a sealed bonded joint between respective parts.

In accordance with some examples of the disclosure, a slurry composition may be employed to join the surfaces of a CMC part to another CMC part and/or a CMC part to a ceramic part. The slurry composition may include a carrier material (e.g., water or other liquid solvent) and solid particles in the carrier. The slurry composition may use suitable reactive additive particles (e.g., for brazing and/or sintering) in combination with SiC particles (e.g., both finer and coarser SiC particles). To join respective components, a layer of the slurry composition may be formed between respective CMC/ceramic parts and then heated to remove the carrier and fuse the SiC particles to each other with the additive particles to form a fused SiC based joint between the respective CMC/ceramic parts. In some examples, the solid particles of the slurry composition may be selected in a manner that allows for the formation of suitable joint between respective CMC/ceramic parts using a processing temperature without the need for application of an external pressure or other force to form the joint during heating.

In some examples, a slurry composition may primarily include (e.g., about 85 to 95 volume percent (vol %) SiC particles of the total solid particles. The phase and/or particle size of the SiC particles may be tailored to achieve relatively high amounts of SiC present in the joint formed by heating the slurry composition, e.g., by a slurry composition with a relatively high solid loading (e.g., at least about 35 vol. % solids in the slurry). The relatively high solid loading of the slurry composition may provide for a relatively dense SiC-based layer after the heating of the slurry composition to form a joint layer and, thus, a relatively dense interface between parts joined by the joint layer.

The slurry composition may also include (e.g., relatively fine) additive particles, such as yttria ($Y_2O_3$) and alumina ($Al_2O_3$) particles, used, e.g., as reactive additives. The additive particles may be selected to fuse the SiC particles within the fused layer upon heating of the slurry composition during heat treatment of the joint layer. In some examples, the temperature of the heating step(s) may be selected for sintering such that, during the heating of the slurry composition, the reactive additives do not melt since the sintering temperature is lower than the melting temperature of the reactive additives. However, the heat treatment temperature may allow for solid state diffusion to occur. In the case of alumina and yttria as the reactive additive particles in the slurry composition, the alumina and yttria may diffuse as well as the alumina-yttria-silica. The silica from the latter comes from the scale on the SiC particles. In such examples, this process may be a sintering process, e.g., as compared to brazing, where the joining material is typically different from the base materials, and the entire braze paste melts and resolidifies during a brazing process.

During the heating of the slurry composition of the joint layer, the reactive additives may segregate at grain boundaries. In examples in which the reactive additives are yttria and alumina, the reactive products are yttrium aluminum garnet (YAG, $Y_3Al_5O_{12}$) phase. In addition, there may be a reaction of the reactive additive with the oxide scale on SiC particles that results in a silicate phase (Yttria-Silica, Alumina-Silica, or Yttria-Alumina-Silica). All of these are intergranular phases within the heat treated joint.

In some examples, the additive particles may be present in about 5 vol. % to about 15 vol. % in the solids of the slurry. The inclusion of the additive particles may allow for the fusing of the SiC particles to form a joint layer between the respective parts at relatively low temperature and/or pressure, e.g., as compared to a slurry composition that only included SiC particles.

Tailoring the particle size and/or vol % of the additive particles may help facilitate the formation of a high creep resistant oxide phase, such as a garnet intergranular phase (yttrium aluminum garnet (YAG) phase, $Y_3Al_5O_{12}$), and/or a silicate ternary phase in the joint layer formed by heating and cooling the slurry composition. For example, with additive particles in the form of yttria and alumina, yttrium aluminum garnet (YAG) as an intergranular phase may be present in the joint layer. In addition, a yttrium aluminum silicate ternary phase, $Y_2O_3$—$Al_2O_3$—$SiO_2$, also may form by reacting with the $SiO_2$ present on the surface of the SiC particles in the slurry composition.

The sizes and/or phases of the particles in the slurry composition may be selected to tailor the properties of the joint layer resulting from the heating of the slurry composition. In some examples, the SiC particles in the slurry composition may include both alpha and beta phase particles, as well as nano, fine and/or coarse sized particles, e.g., with a particle size varying from about 40 nanometers (nm) to about 15 micrometers (μm). In some examples, beta phase SiC particles may be employed, e.g., as smaller (e.g., fine and/or nano) SiC particles, while alpha phase particles may be employed, e.g., as the larger (e.g., coarse) SiC particles. In some examples, the surface of beta phase particles may be more reactive because of its lower particle size distribution which gives a higher surface to volume ratio and hence a higher content of silica ($SiO_2$). The alpha phase particles may be relatively more stable/less reactive with the additive particles.

The overall solid loading in the slurry composition may be about 35 to 50 vol % by using SiC particles having larger and smaller particles sizes (e.g., both fine and coarse SiC particles). Higher packing density and reduced cracking may be achieved in the joint layer formed by heating the slurry composition by varying particle size, e.g., to provide for relatively high solid loading in the slurry composition. In some examples, the reactive additive particle size may range from about 50 nm to about 0.5 μm. In some examples, the fine or smaller particle size particles (with higher surface to volume ratio) may help to speed up the reaction rate within the slurry composition during the heating process, which helps to reduce the temperature and hold time required for the process.

Figure 1B:
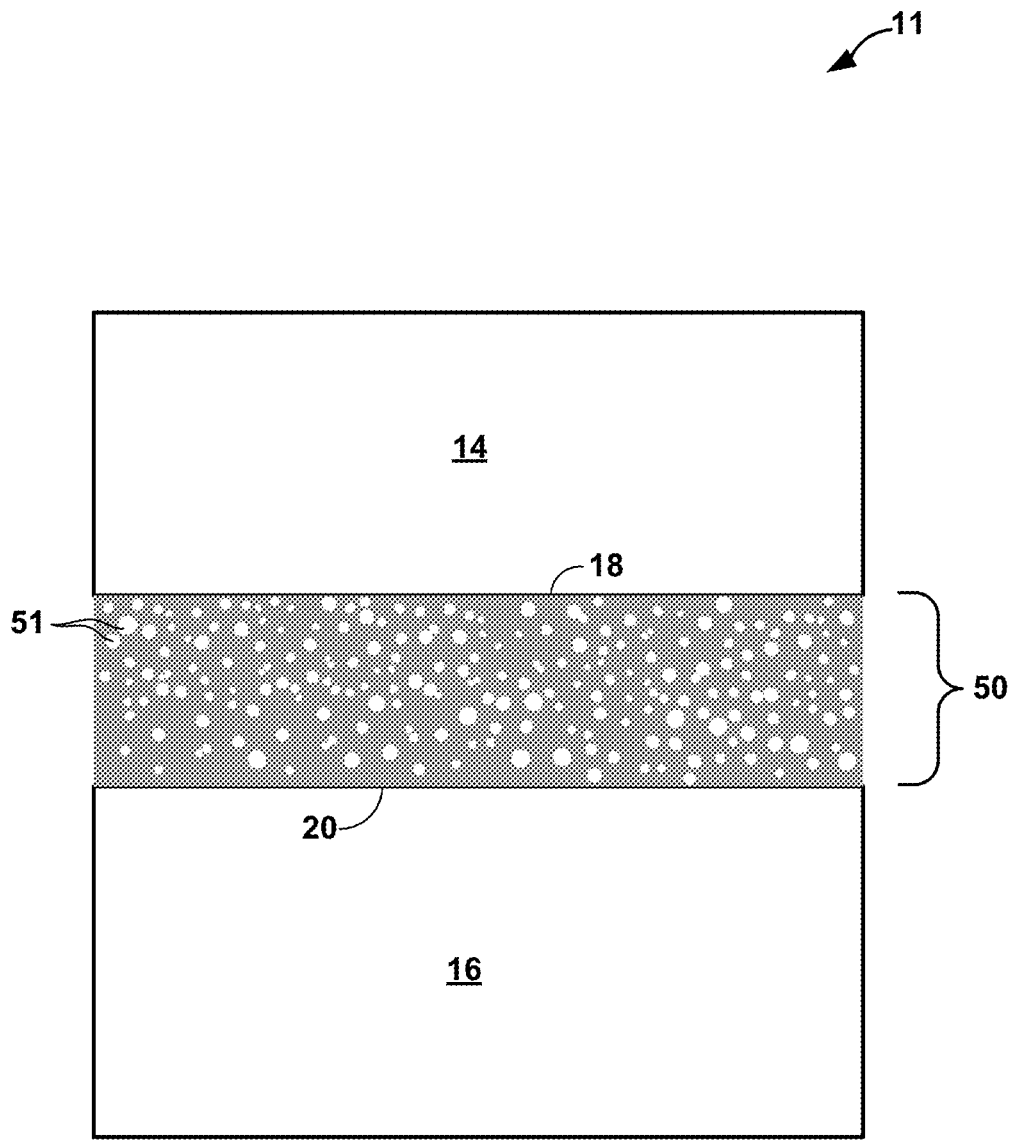
FIG. 1B is a conceptual schematic diagram illustrating an example composite assembly including a joint between two CMC components in accordance with some examples of the disclosure.

FIG. 1A is a conceptual diagram illustrating an example composite assembly 10 including first ceramic/CMC part 14 and second ceramic/CMC part 16 with layer of slurry composition 12 (also reference to as slurry layer 12) between part 14 and part 16. Slurry layer 12 may be used to form a joint or other connection between part 14 and part 16, e.g., after heating the composition of slurry layer 12. FIG. 1B is a conceptual diagram illustrating an example composited assembly 11 including first ceramic/CMC part 14 join to second ceramic/CMC part 16 by joint layer 50. Joint layer 50 may be formed by heating and subsequent cooling of slurry layer 12 shown in the assembly 10 of FIG. 1A, as described herein.

First ceramic/CMC part 14 and second ceramic/CMC part 16 may be parts that form a component of a high temperature mechanical system. For example, first ceramic/CMC part 14 and second ceramic/CMC part 16 may together be a blade track, an airfoil, a blade, a combustion chamber liner, or the like, of a gas turbine engine. In some examples, first ceramic/CMC part 14 and second ceramic/CMC part 16 may be parts that form a component with used for nuclear based applications, such as, damage tolerant high-temperature claddings.

In some examples, first ceramic/CMC part 14 and second ceramic/CMC part 16 include a ceramic or a CMC that includes Si. In some examples, first ceramic or CMC part 14 and second ceramic or CMC part 16 may include a silicon-based material, such as silicon-based ceramic or a silicon-based CMC.

In some examples in which first ceramic/CMC part 14 and second ceramic/CMC part 16 include a ceramic, the ceramic may be substantially homogeneous. In some examples, first ceramic or CMC part 14 and second ceramic or CMC part 16 that includes a ceramic includes, for example, a Si-containing ceramic, such as $SiO_2$, silicon carbide (SiC) or silicon nitride ($Si_3N_4$); $Al_2O_3$; aluminosilicate (e.g., $Al_2SiO_5$); or the like.

In examples in which first ceramic/CMC part 14 and second ceramic/CMC part 16 include a CMC, first ceramic/CMC part 14 and second ceramic/CMC part 16 may include a matrix material and a reinforcement material. The matrix material includes, e.g., a ceramic material, such as, SiC, $Si_3N_4$, $Al_2O_3$, aluminosilicate, $SiO_2$, or the like. The CMC may further include a continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, first ceramic/CMC part 14 and second ceramic/CMC part 16 include a SiC—SiC ceramic matrix composite or an oxide-oxide CMC. In some examples, first ceramic/CMC part 14 and second ceramic/CMC part 16 may be formed of the same material (ceramic or CMC). In other examples, first ceramic/CMC part 14 may be formed of a different material than second ceramic/CMC part 16.

Although FIGS. 1A and 1B illustrates first ceramic/CMC part 14 and second ceramic/CMC part 16 as each defining a simple, substantially rectangular geometry, in other examples, first ceramic or CMC part 14, second ceramic or CMC part 16, or both may define a more complex geometry, including simple or complex curves, overhangs, undercuts, or the like.

First ceramic/CMC part 14 defines at least one joint surface 18. Similarly, second ceramic/CMC part 16 defines at least one joint surface 20. In some examples, joint surfaces 18 and 20 may define complementary shapes. FIGS. 1A and 1B illustrates joint surfaces 18 and 20 as defining substantially planar surfaces adjacent to each other extending in a substantially parallel manner. In other examples, joint surfaces 18 and 20 may define other shapes, including, for example, simple or complex curves, undercuts, or the like.

First ceramic or CMC part 14 and second ceramic or CMC part 16 are positioned such that joint surfaces 18 and 20 are adjacent to each other and define a joint or joint location 22. Joint or joint location 22 may be any kind of joint, including, for example, at least one of a bridle joint, a butt joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 18 and 20 may have any corresponding geometries to define the surfaces of the joint 22. For example, for a mortise and tenon joint, first ceramic/CMC part 14 may define a mortise (a cavity) and second ceramic/CMC part 16 may define a tenon (a projection that inserts into the mortise). As another example, for a splice joint, first ceramic/CMC part 14 may define a half lap, a bevel lap, or the like, and second ceramic/CMC part 16 may define a complementary half lap bevel lap, or the like.

As show in FIG. 1, prior to heating to join first part 14 and second part 16, layer of slurry composition 12 may be deposited in and/or adjacent to joint 22 defined by surface portions 18 and 20. For example, layer of slurry composition 12 may be deposited on surface 20 of second part 16 and then surface 18 of first part 14 may then be positioned adjacent layer of slurry composition 12, e.g., in the configuration shown in FIG. 1A. In other examples, first part 14 and second part 16 may be positioned adjacent to each other with joint 20 between surfaces 18 and 20, and joint 20 may be filled with the slurry composition to form slurry layer 12.

As described herein, the composition of slurry layer 12 may include one or more carrier materials 24 (e.g., solvents) combined with a plurality solid particle. The plurality of solid particles may include SiC particles such as SiC particles 26A and 26B (collectively SiC particles 26) and reactive additive particles 28. In some examples, carrier material 24 may include at least one solvent compatible with solid particles 26 and 28 including, for example, water, ethanol, isopropyl alcohol, methyl ethyl ketone, toluene, or the like. In some examples, slurry layer 12 may include about 35 percent by volume (vol. %) to about 50 vol. % carrier material 24, e.g., with the remainder being solids (e.g., solid particles 26 and 28). During the heating of slurry layer 12 (e.g., in a single or multiple steps), carrier material 24 may be substantially removed (e.g., removed or nearly removed) from slurry layer 12, leaving behind the solid contents of the slurry composition (e.g., solid particles 26 and 28).

SiC particles 26 in slurry layer 12 may be particles of SiC. In some examples, SiC particles are high purity (e.g., greater than 99 weight percent (wt. %) SiC) particles. As described herein, the SiC particles may be beta phase SiC particles and/or alpha phase SiC particles. In some examples, SiC particles 26 include SiC without any alloying element added (e.g., other than sintering/reactive additive).

Slurry layer 12 also includes reactive additive particles 28 in addition to SiC particles 26. In some examples, reactive additive particles 28 may include two different types of reactive particles (e.g., with both yttria ($Y_2O_3$) and alumina ($Al_2O_3$) particles). Reactive additive particles 28 in slurry layer 12 may be configured to react with themselves (e.g., one type of reactive particle reacting with the other type reactive particle) and/or also with passive $SiO_2$ present on the surface of SiC particles 26 during the heating of slurry layer 12, described above. In some examples, reactive additive particles 28 have lower melting temperature than SiC particles 26.

During the heating of slurry layer 12 to form joint layer 50, the temperature may be below the melting temperature of SiC particles 26 while still allowing for the fusing and/or chemical bonding of SiC particles 26 by reactive additives 28. For example, the reactive additives 28 may be sintered during the heating to form chemical bonds between SiC particles and/or react with themselves (one type reactive additive particles reacting with another type reactive additive particles) to form an intergranular phase (e.g., garnet phase) along the grain boundaries of SiC. In some examples, reactive additives 28 also react with the $SiO_2$ scale on the SiC particle 26 surface during the heating process, as a secondary reaction.

Thus, the temperature during heating of slurry layer 12 to form joint layer 50 may be less compared to examples in which a slurry includes only SiC particles, where a high temperature and high pressure would be needed to form a suitable joint between parts 14 and 16. Likewise, the heating process may not require the application of pressure to slurry layer 12 between parts 14 and 16 during the heating of slurry layer 12 while still providing for a dense joint layer 50, e.g., due to the high loading of solids and SiC as well as the presence of reactive additives 28. Example types of reactive additive particles 28 include one or more of alumina ($Al_2O_3$), yttria ($Y_2O_3$), silica ($SiO_2$), magnesia (MgO), and/or other high temperature oxides.

SiC particles 26 in slurry mixture 12 may vary in size and/or phase, e.g., to allow for relatively high amounts of SiC present in slurry layer 12 and, correspondingly, joint layer 50. In some examples, of the total solids in the slurry composition of layer 12, at least about 85 vol. % may be SiC particles 26, such as about 85 vol. % to about 96 vol. %, about 90 vol. % to about 96 vol. %, or about 93 vol. % to 96 vol. % may be SiC particles 26, e.g., with the remainder being reactive additive particles 28. In some examples, SiC particles 26 range in particle size from about 50 nm to about 15 μm.

As will described herein, SiC particles 26 may have varying sizes selected to allow for relatively high loading of solids 26, 28 for slurry layer 12 and, correspondingly, a relatively dense joint layer 50 resulting from the heating and cooling of slurry layer 12. For example, SiC particles 26 may include both finer SiC particles 26A and coarser SiC particles 26B, where finer SiC particles 26A define an average fine particle size that is less than an average coarser particle size defined by coarser particles 26B.

In some examples, SiC particles 26 has a multimodal particle size distribution. As used herein, a "multimodal particle size distribution" describes a particle size distribution that includes two or more peaks. In other words, SiC particles 26 may include two or more subsets of particles, each subset of particles defining a different average or median particle diameter. For example, in the example of FIG. 1A, SiC particles 26 may have a bimodal particle size distribution, and may include plurality of finer particles 26A that defines a first average or median particle diameter and plurality of coarser particles 26B that defines a second average or median particle diameter. As shown in FIG. 1A, coarser SiC particles 26B may define a larger average or median particle diameter than finer SiC particles 26A. In some examples, finer SiC particles 26A and coarser SiC particles 26B may each define an average or median particle diameter from about 50 nm to about 15 μm, with finer SiC particles 26A having an average medium particle size that is less than coarser particles 26B.

As another example, SiC particles 26 may have a trimodal particle size distribution, and may include a plurality of first particles defines a first average or median particle diameter, a plurality of second particles that defines a second average or median particle diameter, and a plurality of third particles that defines a third average or median particle diameter. The first average or median particle diameter may be less than the second average or median particle diameter, and the second average or median particle diameter may be less than the third average or median particle diameter. In some example, the first, second, and third average or median particle diameter particles 26B may each define an average or median particle diameter within a range of about 40 nm to about 15 μm.

In one example, SiC particles 26 may include "nano" SiC particles, e.g., having an average particle size of about 40 nanometers (nm) to about 100 nm, such as about 50 nm; "fine" SiC particles having an average particle size of about 0.7 micrometers (μm) to about 4.5 μm, such as about 3.0 μm; and/or "coarse" SiC particles having an average particle size of about 7.0 μm to about 17 μm, such as about 12 μm. In some examples, coarser SiC particles 26B may define an average particle size of about 12 μm with a standard deviation of less than about +2 μm. In some examples, finer SiC particles 26A may define an average particle size with a standard deviation of less than about +0.25 μm. In some examples, coarser SiC particles 26B with a coarse size may account for about 0 vol. % to about 10 vol. % of the solid material in slurry layer 12, finer SiC particles 26A with a fine size may account for about 80 vol. % to about 94 vol. % of the solid material. In some examples, slurry layer 12 may additionally or alternatively include SiC particles with a nanoparticle size (not shown in FIG. 1A) accounting for about 5 vol. % to about 8 vol. % of the solid material in slurry layer 12.

In some examples, SiC particles 26 having a multimodal distribution may allow for better packing or solid loading of SiC particles 26 in slurry composition 12. For example, finer SiC particles 26A may be able to fill more open space between coarser SiC particles 26B within slurry composition 12 in comparison to a slurry composition that does not have a multimodal particle size distribution for the solid content. In turn, the combination of finer and coarser particles 26A, 26B may be substantially evenly distributed throughout slurry composition in comparison to SiC particles including a unimodal distribution of particle size. The more even distribution of SiC particles 26 throughout slurry composition 12 may result in a more uniform joint layer 50 formed from slurry composition 12 after heating as described herein. Additionally, or alternatively, SiC particles 26 that have a multimodal size distribution may allow for a relatively high loading of SiC particles and solid particles generally in slurry layer 12. This may allow for joint layer 50 formed from the heating of slurry layer 12 in the manner described herein to have a relatively high density and to prevent shrinkage of slurry layer 12 during the heating process (e.g., sintering). The cracking of joint layer 50 may be reduced or otherwise prevented by the high solid loading in slurry layer 12.

SiC particles 26 may be present is multiple phases in slurry 12. For example, SiC particles in slurry composition 12 may include both alpha and beta phase SiC particles. The alpha phase particles may be more stable and less reactive with reactive additives 28 as compared to beta phase particles, which may be more reactive and less stable with reactive additives 28. In some examples the beta phase particles may be reactive with the reactive additives 28 as a result of $SiO_2$ on its surface. The phases in slurry composition 12 may be tailored to provide for a desirable amount of reactivity of the SiC with reactive additives while also provide a high solid loading of relatively stable SiC particles. In some examples, about 0 to about 15 percent of the total SiC particles in slurry 12 may be alpha phase SiC. In some examples, about 85 to about 100 percent of the total SiC particles in slurry 12 may be beta phase SiC. In some examples, the ratio of beta phase to alpha phase by volume in slurry composition 12 may be about 0 to about 0.15.

In some examples, the larger/coarser SiC particles may be alpha phase SiC particle and the smaller/finer particles may be beta phase particles. In some examples, coarser SiC particles 26B may be predominantly (e.g., greater than 50 vol. % or substantially all (e.g., greater than 99 vol. %) of coarser SiC particles 26B) alpha phase SiC particles and finer SiC particles 26A (e.g., fine and/or nano sized) may be predominantly (e.g., greater than 50 vol. % or substantially all (e.g., greater than 99 vol. %) of finer SiC particles 26A beta phase SiC particles.

Reactive additive particles 28 may also have any suitable size in slurry layer 12. In some examples, reactive additive particles 28 have an average particle size that is less than coarser SiC particles 26B in slurry layer 12. In some examples, reactive additive particles 28 may have an average particle size of about 0.05 µm to about 0.7 µm. IN some examples, reactive additive particles 28 may be nanoparticles due to higher to surface to volume ratio, which may give higher surface for reaction and enable reaction at lower temperature. Reactive particles 28 in the form of alumina particles may have an average particle size less than (<) about 50 nanometers. Reactive particles 28 in the form of yttria particles may have an average particle size of about 1 µm to about 5 µm. The size of reactive particles 28 may allow for particles 28 to be relatively uniformly dispersed with SiC particles 26 such as between coarser SiC particles 26B in slurry 12.

Suitable amounts of solid particles (e.g., SiC particles 26 plus reactive additives 28) may be mixed with the carrier 24 to form slurry 12 that exhibits the desired properties. In some examples, slurry layer 12 may include between about 35 vol. % to about 50 vol. % solids, such as about 40 vol. % to about 45 vol. % solids, with the remainder being carrier 24 (e.g., water). In some examples, slurry layer 12 may include at least about 50 vol. % carrier 24, such as about 50 vol. % to about 65 vol. % or about 60 vol. % to about 65 vol. % carrier 24, e.g., with the balance of slurry 12 comprising, consisting, or consisting essentially of the combination of SiC particles 26 and reactive additive particles 28. The formed slurry 12 may have a viscosity that allows slurry 12 to be deposited using a desired technique, e.g., via by application of the slurry with a brush, spin coating, or dip coating.

FIG. 1B is a conceptual diagram illustrating assembly 11 including first ceramic/CMC part 14 and a second ceramic/CMC part 16 joined by joint layer 50. Assembly 11 may be formed by heating slurry composition 12 of assembly 10 of FIG. 1A to a temperature below the melting temperature of reactive additives 28 (and SiC particles 26) to sinter slurry composition 12 so as to form joint layer 50. For example, the heating may sinter the slurry composition 12 to fuse SiC particles 26 to each other, e.g., with the intergranular phase formed by the reaction of reactive additives 28 with each other during the heating process. The temperature of the heating step may cause additive particles 28 to diffuse, and also react with the oxide on the SiC surface and bond SiC particles 26 together. In some examples, some coarsening of the SiC particles 26 may also occurs due to high temperature exposure. The heat treatment temperature may be selected such that there is substantially no diffusion in the SiC particles 26. The intergranular phase that forms during the heating may "lock" particles 26 in one position once joint layer 50 cools down.

Joint layer 50 joins or otherwise attaches first ceramic/CMC part 14 and a second ceramic/CMC part 16. For example, during the heating process, portion of slurry composition 12 may wet joint surfaces 18 and 20. The subsequent cooling of joint layer 50 may provide for attachment (e.g., via interfacial interlocking) between joint layer 50 and joint surface 18 and, likewise, between joint layer 50 and joint surface 20. In this manner, joint layer 50 may function to attach first ceramic/CMC part 14 and a second ceramic/CMC part 16. The presence of reactive additives 28 in slurry composition 12 may allow for joint layer 50 to be formed without the application of relatively high temperature and high pressure, e.g., as may be the case if slurry composition 12 included only SiC particles 26 without reactive additives 28.

Joint layer 50 may have a composition and structure that results from the heating of slurry composition 12 in the manner described herein. Joint layer may include a primary phase of SiC, a secondary phase (e.g., an intergranular garnet phase) formed by the reaction of reactive additives 28 with other reactive additives 28 and, in some instances, a relatively minor ternary phase formed by the reaction of reactive additives 28 with silica (oxide scale) present on the surface of SiC particles 26. In some examples, the intergranular phase formed during the heating of slurry composition 12 may fuse the SiC particles 26 from slurry composition 12 to form a relatively dense, SiC-based joint layer 50. In some examples, joint layer 50 may have a small grain microstructure with primary SiC phase, a secondary phase (e.g., a garnet phase formed by reacting alumina with yttria) at grain boundaries and, in some examples, a ternary phase formed by the reaction of reactive additives 28 with silica present on surface of SiC particles 26. All of the phases in joint layer 50 may be high temperature capable, e.g., stable at high temperatures such that the operation of joint 50 in a high temperature environment will not melt or otherwise degrade joint layer 50.

In some examples, depending on the composition of slurry layer 12, joint layer 50 may include at least about 90 vol. % SiC, such as, about 92 vol. % to about 95 vol. % SiC. In some examples, depending on the composition of slurry layer 12, joint layer 50 may include at least about 4.5 vol. % of the secondary garnet phase, such as, about 4.5 vol. % to about 6.5 vol. % or at least about 6 vol. %. In some examples, depending on the composition of slurry layer 12, joint layer 50 may include at least about 1.2 vol. % of the secondary garnet phase, such as, about 1.2 vol. % to about 3.0 vol. %. In some examples, depending on the composition of slurry layer 12, remaining portion of joint layer 50 may include the ternary phase.

Joint layer 50 may have a relatively high density despite, in some examples, the lack of additional pressure being applied with the heating (e.g., sintering) of slurry composition 12 to form joint layer 50. For example, relatively high loading of SiC particles 26 in slurry layer 12 may provide for joint layer 50 that has a density of at least about 65% of theoretical density, such as a density of about 70% to about 80% of theoretical density.

Joint layer 50 may exhibit at least some void volume. For example, as illustrated in FIG. 1B, joint layer 50 may include open pores, such as pores 51 labelled in FIG. 1B, which define a void volume of layer 50. The porosity of joint layer 50 may be an open and/or closed porosity. Although joint layer 50 may have a relatively high SiC volume percent, in some examples, the reactive additives 28 may react and fuse the SiC particles 26 together without any or an appreciable amount of external mechanical force during the heating process. Hence, joint layer 50 may be relatively porous, e.g., as compared to rest of the densification mechanisms described herein. In some examples, joint layer 50 may exhibit a void volume (e.g., porosity) of about 20 volume percent or less, preferably, e.g., about 10 volume percent or even less. The application of force during the heating process to form joint layer 50 may reduce the void volume of joint layer 50 as compared to the formation of layer 50 without application of an additional force during the heating process.

Figure 2:
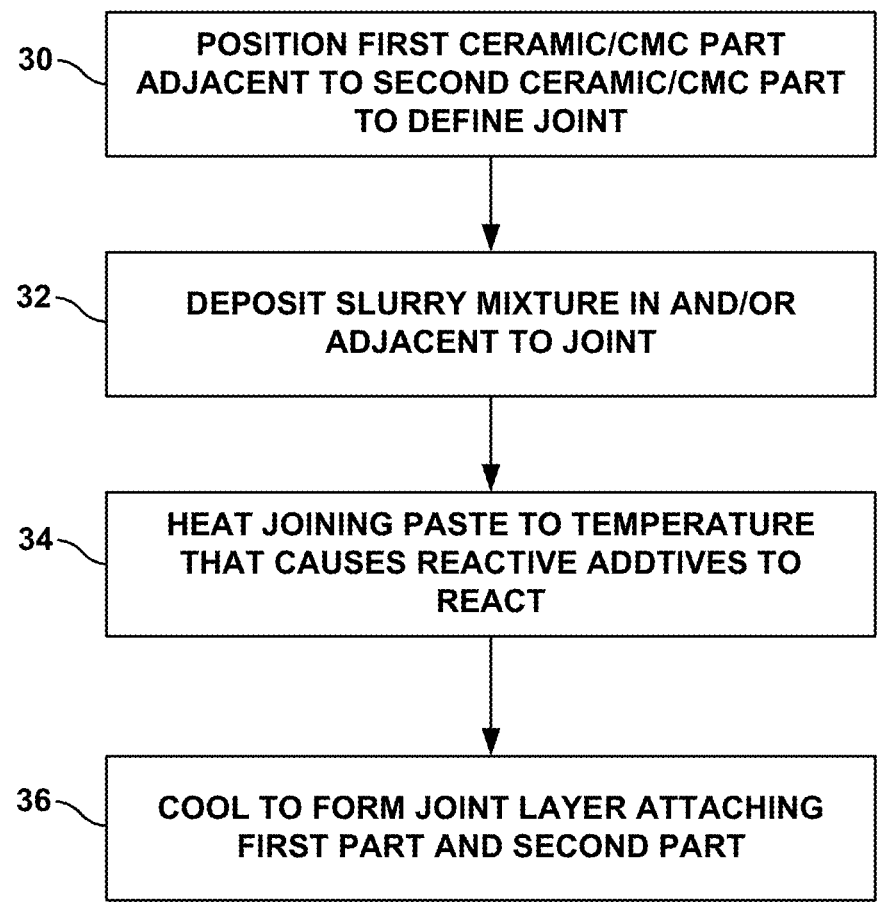
FIG. 2 is a flow diagram illustrating an example technique for forming a joint connecting two ceramic/CMC parts using a slurry composition in accordance with some examples of the disclosure.

FIG. 2 is a flow diagram illustrating an example technique for joining first ceramic/CMC part 14 and a second ceramic/CMC part 16 using slurry layer 12. The technique of FIG. 2 will be described with reference to assemblies 10 and 11 as shown in FIGS. 1A and 1B, respectively, for ease of description, although the technique may be used to form other assembly configurations including two or more ceramic/CMC parts connected to each other.

As shown in FIG. 2, first ceramic/CMC part 14 and second ceramic/CMC part 16 may be positioned adjacent to each other to define joint 22 between adjacent portions of the first ceramic/CMC part 14 and the second ceramic/CMC part 16 (30). Slurry composition 12 may be deposited in the joint and/or adjacent joint 22, e.g., via a brush, dip coating, or other suitable technique (32). Additionally, or alternatively, a layer of slurry composition 12 may be deposited (e.g., evenly) on joint surface 20 of second ceramic/CMC part 16. Once deposited, first ceramic/CMC part 14 may be positioned adjacent to slurry layer 12 with joint surface 18 in contact with slurry layer 12, e.g., in the configuration shown in FIG. 1A.

Following deposition of slurry 12 (32), assembly 10 may be placed in a furnace for sintering and/or other heating. For example, assembly 10 may be placed in a furnace for sintering and/or other heating by raising the temperature of slurry layer 12 to a heat treatment temperature that is below the melting temperature of the reactive additives but high enough for reactive additives 28 to react as described herein (e.g., with each other to form an intergranular phase) (34). The temperature of slurry layer 12 during the sintering/heating step may be less than the melting temperature of SiC particles 26 as well as being below a temperature that could damage components of ceramic/CMC part 14 and second ceramic/CMC part 16. As described above, during the heating of slurry layer 12, reactive additives 28 do not melt since the sintering temperature is lower than the melting temperature of reactive additives 28. However, the heat treatment temperature may be selected to allow for solid state diffusion to occur. Reactive additives 28 (e.g., alumina and yttria) may diffuse as well as the yttrium aluminum silicate ternary phase (alumina-yttria-silica phase). The silica from the yttrium aluminum silicate ternary phase comes from the oxide scale on SiC particles 28.

The heating of slurry composition 12 may fuse SiC particles to each other. As described above, to form joint 50 joining part 14 to part 16, substrate the temperature of the heating step (34) may cause reactive additive particles 28 to diffuse, and also react with the oxide on the SiC surface and bond SiC particles 26 together. In some examples, some coarsening of the SiC particles 26 may also occurs due to high temperature exposure. The heat treatment temperature may be selected such that there is substantially no diffusion in the SiC particles 26. The intergranular phase that forms during the heating may "lock" particles 26 in one position once joint layer 50 cools down.

During the heating of the slurry composition of the joint layer (34), the reactive additives 28 may segregate at grain boundaries. In examples in which the reactive additives 28 are yttria and alumina, the reactive products are yttrium aluminum garnet (YAG, $Y_3Al_5O_{12}$) phase. In addition, there may be a reaction of the reactive additives 28 with the oxide scale on SiC particles 26 that results in a silicate phase (Yttria-Silica, Alumina-Silica, or Yttria-Alumina-Silica). All of these are intergranular phases within the joint 50 formed by the heating/sintering of slurry composition 12.

Depending on the composition of the reactive additives and/or other properties of slurry layer 12, the temperature during heating may be, e.g., greater than about 1400 degrees Celsius, such as, about 1400 degrees Celsius to about 1850 degrees Celsius or about 1400 degrees Celsius to about 1550 degrees Celsius. The particular heat treatment temperature for slurry layer 12 may be selected based the temperature needed to result in an intergranular phase in joint layer 50 for on the composition of slurry layer 12, e.g., as indicated in a phase diagram for the composition.

Slurry layer 12 may be held at the heat treatment temperature for a suitable amount of time to form joint layer 50 from slurry 12. In some examples, slurry layer 12 may be heated to greater than about 1400 degrees Celsius, such as, about 1400 degrees Celsius to about 1850 degrees Celsius or about 1400 degrees Celsius to about 1550 degrees Celsius, for about 30 minutes to about 2 hours.

Although not shown in FIG. 2, in some examples, following deposition of slurry 12 (32), an initial heat treatment may be performed on assembly 10 to remove carrier 24 or otherwise dry the volatiles from slurry layer 12. For example, depending on the vaporization temperature of the selected carrier 24, the initially heating step may include heating slurry layer 12 to about 25 degrees Celsius to about 150 degrees Celsius, e.g., for about 30 minutes to about 2 hours. In other examples, a single heat treatment may be carried out in which slurry layer 12 is heated in a manner that removes carrier 24 and forms joint layer 50.

As noted above, in some examples, there is no requirement for application of additional external pressure to slurry layer 12 between first ceramic/CMC part 14 and second ceramic/CMC part 16, e.g., the optional initial removal of carrier 24 (by vaporization, e.g.) and heating of layer 12 to form joint layer 50, e.g., by liquid phase sintering. In some examples, gravitational forces may apply enough pressure between respective parts during the heat treatment(s) to provide for a relatively dense joint layer 50. This may result from the relatively high loading of SiC in slurry 12 and/or the formation of the intergranular phase from the reaction of additives 28 in slurry 12 to fuse the respective SiC particles 26 in slurry 12 to form joint layer 50. Joint layer 50 may have a relatively high density and relatively close thermal expansion match with first ceramic/CMC part 14 and second ceramic/CMC part 16. The high density of joint layer 50 may prevent shrinkage during the heating of slurry 12 to form joint layer 50, thus preventing cracking of joint layer 50.

In the case of more than one joint being needed, the process of FIG. 2 may be repeated for each joint, e.g., on a serial basis once the heat treatment of respective joint is completed, or on a parallel basis with multiple joints being formed at once.

Figure 3:
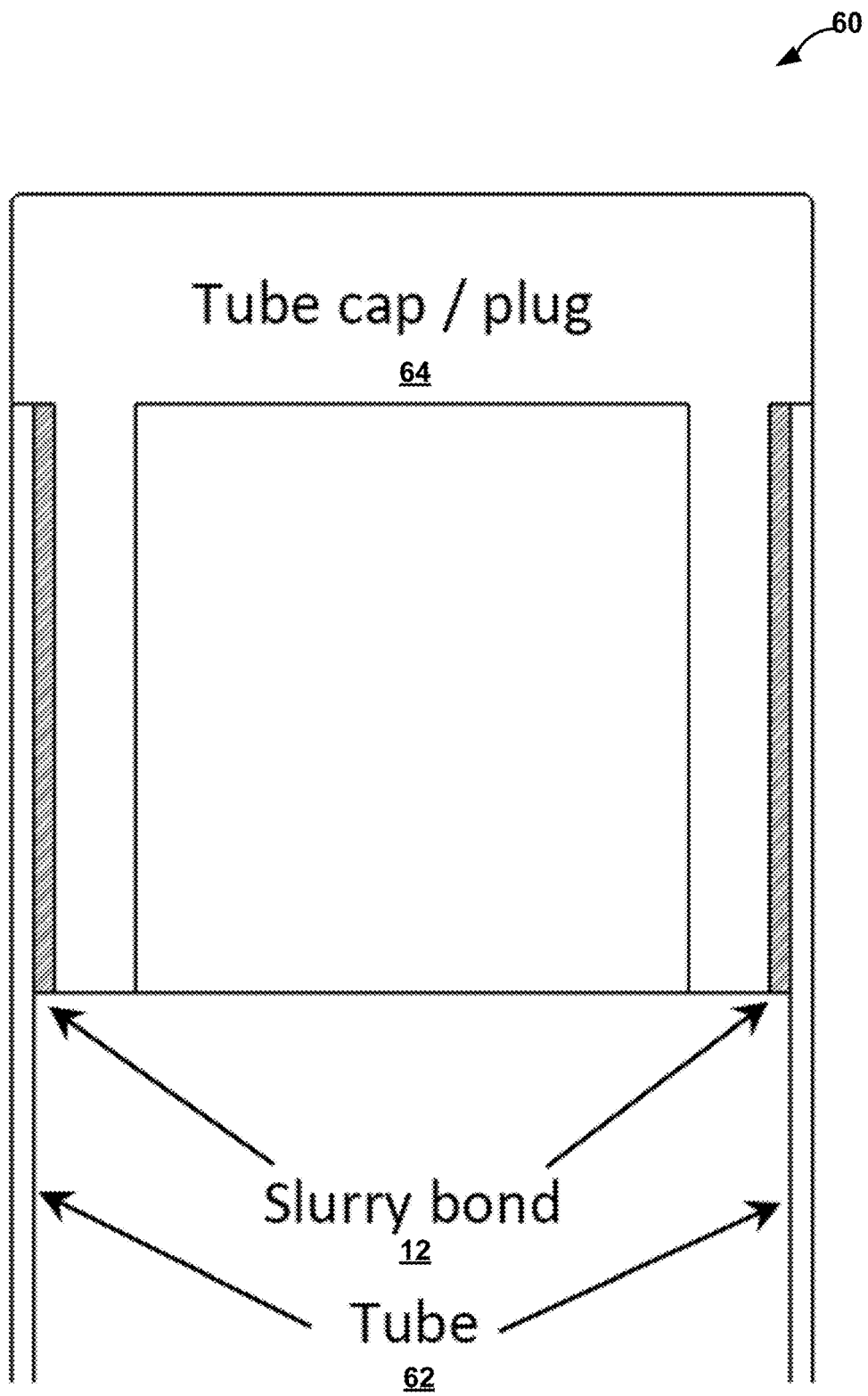
FIG. 3 is a conceptual schematic diagram of a tube and tube cap joined by a slurry composition in accordance with some examples of the disclosure.

FIG. 3 is a conceptual diagram illustrating an example assembly 60 including an end of tube 62 and tube cap/plug 64 from a cross-sectional view. As shown, slurry layer 12 (labelled as slurry bond in FIG. 3) may be applied between the inner surface of tube 62 adjacent to the end of the tube and tube cap/plug 64. Tube cap/plug 64 may be positioned to cover the opening at the end of tube 62. Both tube 62 and tube cap/plug 64 may be a ceramic or CMC part, e.g., as described for first ceramic/CMC part 14 and second ceramic/CMC part 16 in FIGS. 1A and 1B. In the example of FIG. 3, slurry 12 may be applied to the interior surface of tube 62 and then inserting tub cap/plug 64 into the open end. Tube cap/plug 64 may be rotated to spread slurry 12 evenly between the respective parts. Slurry 12 may undergo heat treatment, e.g., as described in the process of FIG. 2, to form a joint layer such as joint layer 50 between tube 62 and tube cap/plug 64 from slurry 12.

Example of the present disclosure may provide for one or more benefits. For example, using the slurry composition and techniques describes herein, the application of high pressure to join ceramic/CMC parts may not be required, which may not even be feasible with complex shapes. As another example, examples of the disclosure may enables joining of dissimilar materials such as a ceramic part to a CMC part. As another example, examples of the disclosure may provide for the formation of joint layer that is stable at high temperatures and is compatible in coefficient of thermal expansion with the base ceramic or CMC part materials. As another example, examples of the disclosure may minimize machining of hard and brittle monolithic SiC layer, e.g., to reduce tool wear and likelihood of cracking of the joining layer.

Various examples have been described. These and other examples are within the scope of the following clauses and claims.

Clause 1. A method comprising: forming a layer of a slurry composition between a first ceramic or ceramic matrix composite (CMC) part and a second ceramic or CMC part, wherein the slurry composition comprises a carrier material; and a plurality of solid particles in the carrier material, wherein the plurality of solid particles comprises: a plurality of first silicon carbide (SiC) particles defining a first average particle size, a plurality of second SiC particles defining a second average particles size that is less than the first average particles size, and a plurality of reactive additive particles, wherein the plurality of additive particles has a melting temperature that is less than the plurality of first SiC particles and the plurality of second SiC particles; and heating the layer of slurry composition to react the plurality of reactive additive particles to fuse the plurality of first SiC particles and the plurality of second SiC particles together with the reactive additive particles, wherein the fused layer of the slurry composition forms a joint layer that joins the first ceramic or CMC part to the second ceramic or CMC part.

Clause 2. The method of clause 1, wherein heating the layer of slurry composition comprises at least one of brazing or sintering the layer of slurry without melting the plurality of first SiC particles and the plurality of second SiC particles.

Clause 3. The method of clause 1, wherein the heating the layer of slurry composition is configured such that the additive particles react with silica on a respective surface of at least one of the plurality of first SiC particles or the plurality of second SiC particles to form a silicate ternary phase in the joint layer.

Clause 4. The method of any one of clauses 1-3, wherein the heating of the layer of slurry composition is configured such that a garnet intergranular phase is formed at grain boundaries in the joint layer by the reaction of the plurality of reactive additive particles with each other.

Clause 5. The method of any one of clauses 1-4, wherein the plurality of solid particles in the carrier material includes at least about 85 volume percent of a combination of the plurality of first SiC particles and the plurality of second SiC particles.

Clause 6. The method of any one of clauses 1-5, wherein the plurality of solid particles in the carrier material includes at least about 5 volume percent of the plurality of additive particles.

Clause 7. The method of any one of clauses 1-6, wherein the plurality of first SiC particles includes at least about 50 percent alpha phase SiC particles.

Clause 8. The method of any one of clauses 1-7, wherein the plurality of second SiC particles includes at least about 50 percent beta phase SiC particles.

Clause 9. The method of any one of clauses 1-8, wherein the slurry composition includes at least 35 volume percent solid loading of the plurality of solid particles.

Clause 10. The method of any one of clauses 1-9, wherein forming the layer of the slurry composition between the first ceramic or CMC part and the second ceramic or CMC part comprises: depositing the slurry composition on a first surface of the first ceramic or CMC part to form the layer of the slurry composition on the first surface; and positioning a second surface of the second ceramic or CMC part on the layer of the slurry composition such that the first surface and the second surface are separated by the layer of slurry composition.

Clause 11. The method of any one of clauses 1-10, wherein heating the layer of slurry composition includes removing the carrier material from the layer of slurry composition.

Clause 12. The method of any one of clauses 1-11, wherein the plurality of additive particles includes at least one of yttria or alumina.

Clause 13. The method of any one of clauses 1-12, wherein heating the layer of slurry composition includes heating the layer of slurry composition without applying additional pressure during the heating.

Clause 14. The method of any one of clauses 1-13, wherein the plurality of first SiC particles comprise coarse particles having the first average particle size of about 7.0 μm to about 17 μm, and wherein the plurality of second SiC particles comprise fine particles having the second average particle size of about 0.7 μm to about 4.5 μm.

Clause 15. The method of clause 14, wherein the plurality of solid particles comprises a plurality of third SiC particles defining a third average particles size that is less than the first average particles size and the second average particle size.

Clause 16. The method of clause 15, wherein the third average particle size is about 40 nanometers (nm) to about 100 nm.

Clause 17. The method of any one of clauses 1-16, wherein the plurality of reactive additive particles includes a plurality of first reactive additive particles and a plurality of second reactive additive particles different from the plurality of reactive additive particles, wherein heating the layer of slurry composition to react the plurality of reactive additive particles comprises heating the layer of slurry composition to react the plurality of first reactive additive particles with the plurality of second reactive additive particles.

Clause 18. The method of clause 17, wherein the plurality of first reactive additive particles comprise yttria and the plurality of second reactive additive particles comprise alumina.

Clause 19. An assembly comprising: a first ceramic or ceramic matrix composite (CMC) part; a second ceramic or CMC part adjacent to the first ceramic or ceramic matrix composite part; and layer of slurry composition between the first ceramic or CMC part and the second ceramic or CMC part, wherein the slurry composition comprises: a carrier material; and a plurality of solid particles in the carrier material, wherein the plurality of solid particles comprises: a plurality of first silicon carbide (SiC) particles defining a first average particle size, a plurality of second SiC particles defining a second average particles size that is less than the first average particles size, and a plurality of reactive additive particles, wherein the plurality of additive particles has a melting temperature that is less than the plurality of first SiC particles and the plurality of second SiC particles, wherein the plurality of reactive additive particles are configured to, upon heating, react to fuse the plurality of first SiC particles and the plurality of second SiC particles together with the reactive additive particles, and wherein the fused layer of the slurry composition forms a joint layer that joins the first ceramic or CMC part to the second ceramic or CMC part.

Clause 20. The assembly of clause 19, wherein the slurry composition is configured such that, upon heating, the additive particles react with silica on a respective surface of at least one of the plurality of first SiC particles or the plurality of second SiC particles to form a silicate ternary phase in the joint layer.

Clause 21. The assembly of any one of clauses 19-20, wherein the slurry composition is configured such that, upon heating, a garnet intergranular phase is formed at grain boundaries in the joint layer by the reaction of the plurality of reactive additive particles with each other.

Clause 22. The assembly of any one of clauses 19-21, wherein the plurality of solid particles in the carrier material includes at least about 85 volume percent of a combination of the plurality of first SiC particles and the plurality of second SiC particles.

Clause 23. The assembly of any one of clauses 19-22, wherein the plurality of solid particles in the carrier material includes at least about 5 volume percent of the plurality of additive particles.

Clause 24. The assembly of any one of clauses 1-6, wherein the plurality of first SiC particles includes at least about 50 percent alpha phase SiC particles.

Clause 25. The assembly of any one of clauses 1-7, wherein the plurality of second SiC particles includes at least about 50 percent beta phase SiC particles.

Clause 26. The assembly of any one of clauses 1-8, wherein the slurry composition includes at least 35 volume percent solid loading of the plurality of solid particles.

Clause 27. The assembly of any one of clauses 19-26, wherein the plurality of reactive additive particles includes at least one of yttria or alumina.

Clause 28. The assembly of any one of clauses 19-28, wherein the plurality of first SiC particles comprise coarse particles having the first average particle size of about 7.0 µm to about 17 µm, and wherein the plurality of second SiC particles comprise fine particles having the second average particle size of about 0.7 µm to about 4.5 µm.

Clause 29. The assembly of clause 28, wherein the plurality of solid particles comprises a plurality of third SiC particles defining a third average particles size that is less than the first average particles size and the second average particle size.

Clause 30. The assembly of clause 29, wherein the third average particle size is about 40 nanometers (nm) to about 100 nm.

Clause 31. The assembly of any one of clauses 19-30, wherein the plurality of reactive additive particles includes a plurality of first reactive additive particles and a plurality of second reactive additive particles different from the plurality of reactive additive particles, wherein heating the layer of slurry composition to react the plurality of reactive additive particles comprises heating the layer of slurry composition to react the plurality of first reactive additive particles with the plurality of second reactive additive particles.

Clause 30. The assembly of clause 31, wherein the plurality of first reactive additive particles comprise yttria and the plurality of second reactive additive particles comprise alumina.

Clause 31. An article formed using a method according to any one of clauses 1-18.

What is claimed is:
1. A method comprising:
forming a layer of a slurry composition between a first ceramic or ceramic matrix composite (CMC) part and a second ceramic or CMC part, wherein the slurry composition comprises:
a carrier material; and
a plurality of solid particles in the carrier material, wherein the plurality of solid particles comprises:
a plurality of first silicon carbide (SiC) particles defining a first average particle size,
a plurality of second SiC particles defining a second average particles size that is less than the first average particles size, and
a plurality of reactive additive particles, wherein the plurality of additive particles has a melting temperature that is less than the plurality of first SiC particles and the plurality of second SiC particles; and
heating the layer of slurry composition to a temperature below a melting temperature of the plurality of reactive additive particles to react the plurality of reactive additive particles to fuse the plurality of first SiC particles and the plurality of second SiC particles together with the reactive additive particles, wherein the fused layer of the slurry composition forms a joint layer that joins the first ceramic or CMC part to the second ceramic or CMC part.

2. The method of claim 1, wherein heating the layer of slurry composition comprises at least one of brazing or sintering the layer of slurry without melting the plurality of reactive additive particles, the plurality of first SiC particles and the plurality of second SiC particles.

3. The method of claim 1, wherein the heating the layer of slurry composition is configured such that the additive particles react with silica on a respective surface of at least one of the plurality of first SiC particles or the plurality of second SiC particles to form a silicate ternary phase in the joint layer.

4. The method of claim 1, wherein the plurality of solid particles in the carrier material includes at least about 85 volume percent of a combination of the plurality of first SiC particles and the plurality of second SiC particles.

5. The method of claim 1, wherein the plurality of solid particles in the carrier material includes at least about 5 volume percent of the plurality of additive particles.

6. The method of claim 1, wherein the plurality of first SiC particles includes at least about 50 percent alpha phase SiC particles.

7. The method of claim 1, wherein the plurality of second SiC particles includes at least about 50 percent beta phase SiC particles.

8. The method of claim 1, wherein the slurry composition includes at least 35 volume percent solid loading of the plurality of solid particles.

9. The method of claim 1, wherein heating the layer of slurry composition includes removing the carrier material from the layer of slurry composition.

10. The method of claim 1, wherein the plurality of additive particles includes at least one of yttria or alumina.

11. The method of claim 1, wherein heating the layer of slurry composition includes heating the layer of slurry composition without applying additional pressure during the heating.

12. The method of claim 1, wherein the plurality of first SiC particles comprise coarse particles having the first average particle size of about 7.0 µm to about 17 µm, and wherein the plurality of second SiC particles comprise fine particles having the second average particle size of about 0.7 µm to about 4.5 µm.

13. The method of claim 1, wherein the plurality of solid particles comprises a plurality of third SiC particles defining a third average particle size that is less than the first average particle size and the second average particle size.

14. The method of claim 13, wherein the third average particle size is about 40 nanometers (nm) to about 100 nm.

15. The method of claim 1, wherein the plurality of reactive additive particles includes a plurality of first reactive additive particles and a plurality of second reactive additive particles different from the plurality of reactive additive particles, wherein heating the layer of slurry composition to the temperature below the melting temperature of the plurality of reactive additive particles to react the plurality of reactive additive particles comprises heating the layer of slurry composition to the temperature below the melting temperature of the plurality of reactive additive particles to react the plurality of first reactive additive particles with the plurality of second reactive additive particles without melting the plurality of first reactive additive particles and the plurality of second reactive additive particles.

16. The method of claim 15, wherein the plurality of first reactive additive particles comprise yttria and the plurality of second reactive additive particles comprise alumina.

17. The method of claim 1, wherein heating the layer of slurry composition to a temperature below a melting temperature of the plurality of reactive additive particles to react the plurality of reactive additive particles to fuse the plurality of first SiC particles and the plurality of second SiC particles together with the reactive additive particles includes heating the layer of slurry composition to the temperature that cause the plurality of reactive additive particles to diffuse and react with oxide on surfaces of the plurality of first SiC particles and the plurality of second SiC particles but not cause the plurality of reactive additive particles to melt.

18. The method of claim 1, wherein heating the layer of slurry composition to a temperature below a melting temperature of the plurality of reactive additive particles to react the plurality of reactive additive particles to fuse the plurality of first SiC particles and the plurality of second SiC particles together with the reactive additive particles includes heating the layer of slurry composition to the temperature that cause the plurality of reactive additive particles to react with each other to form an intergranular phase at grain boundaries in the joint layer but not cause the plurality of reactive additive particles to melt.

19. The method of claim 1, wherein, following the heating of the layer of the slurry composition, the joint layer includes a primary phase of SiC and an intergranular secondary phase formed by the reaction of the plurality of reactive additive particles with each other.

20. An assembly comprising:
a first ceramic or ceramic matrix composite (CMC) part;
a second ceramic or CMC part adjacent to the first ceramic or ceramic matrix composite part; and
layer of slurry composition between the first ceramic or CMC part and the second ceramic or CMC part,
wherein the slurry composition comprises:
a carrier material; and
a plurality of solid particles in the carrier material, wherein the plurality of solid particles comprises:
a plurality of first silicon carbide (SiC) particles defining a first average particle size,
a plurality of second SiC particles defining a second average particles size that is less than the first average particles size, and
a plurality of reactive additive particles, wherein the plurality of additive particles has a melting temperature that is less than the plurality of first SiC particles and the plurality of second SiC particles,
wherein the plurality of reactive additive particles are configured to, upon heating to a temperature below a melting point of the plurality of reactive additive particles, react to fuse the plurality of first SiC particles and the plurality of second SiC particles together with the reactive additive particles, and wherein the fused layer of the slurry composition forms a joint layer that joins the first ceramic or CMC part to the second ceramic or CMC part.

* * * * *